United States Patent
Shibata et al.

(10) Patent No.: US 9,743,192 B2
(45) Date of Patent: Aug. 22, 2017

(54) SPEAKER AND VIBRATION CONTROL UNIT

(71) Applicant: FUJITSU TEN LIMITED, Kobe-shi, Hyogo (JP)

(72) Inventors: Kiyosei Shibata, Kobe (JP); Hiroshi Kowaki, Kobe (JP); Toshihiro Kido, Kobe (JP); Hirofumi Tetsu, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 13 days.

(21) Appl. No.: 14/958,340

(22) Filed: Dec. 3, 2015

(65) Prior Publication Data

US 2016/0192075 A1    Jun. 30, 2016

(30) Foreign Application Priority Data

Dec. 26, 2014  (JP) ................. 2014-266041

(51) Int. Cl.
| | |
|---|---|
| *H04R 25/00* | (2006.01) |
| *H04R 7/26* | (2006.01) |
| *H02K 33/18* | (2006.01) |
| *H04R 9/06* | (2006.01) |
| *H04R 9/02* | (2006.01) |
| *H04R 1/28* | (2006.01) |

(52) U.S. Cl.
CPC ............ *H04R 7/26* (2013.01); *H02K 33/18* (2013.01); *H04R 1/28* (2013.01); *H04R 1/2803* (2013.01); *H04R 9/027* (2013.01); *H04R 9/063* (2013.01)

(58) Field of Classification Search
USPC ........................................... 381/182
See application file for complete search history.

(56) References Cited

U.S. PATENT DOCUMENTS 4,017,694 A * 4/1977 King .............. H04R 9/027
                                                    381/415
4,176,249 A * 11/1979 Inanaga .......... H04R 9/025
                                                    381/182

(Continued)

FOREIGN PATENT DOCUMENTS

| EP | 1206162 A2 | 5/2002 |
| JP | S63-212000 A | 9/1988 |
| JP | 2002-152884 A | 5/2002 |

(Continued)

OTHER PUBLICATIONS

Jun. 2, 2016 Extended European Search Report issued in Patent Application No. EP 15 20 0639.

*Primary Examiner* — Amir Etesam
(74) *Attorney, Agent, or Firm* — Oliff PLC (57) ABSTRACT

A speaker includes a first vibrator, a first driving unit, a second vibrator, a second driving unit and a supporting unit. The first vibrator is connected to a diaphragm, which vibrates, thereby emitting sound. The first driving unit vibrates the first vibrator, thereby vibrating the diaphragm. The second vibrator is connected to a weight member. The second driving unit is connected to the opposite side of the first driving unit to the first vibrator, and vibrates the second vibrator on the same vibration axis as the vibration axis of the first vibrator, thereby vibrating the weight member. The supporting unit supports a coupled body, configured by joining the second vibrator and the weight member, at two or more portions in the direction of the vibration axis.

12 Claims, 10 Drawing Sheets

(56) References Cited

U.S. PATENT DOCUMENTS

| | | | | |
|---|---|---|---|---|
| 4,628,907 A | * | 12/1986 | Epley | H04R 25/606 |
| | | | | 381/322 |
| 6,678,384 B2 | * | 1/2004 | Kowaki | H04R 1/2896 |
| | | | | 181/144 |

FOREIGN PATENT DOCUMENTS

| | | |
|---|---|---|
| JP | 2004-221880 A | 8/2004 |
| WO | 2005-122636 A1 | 12/2005 |

* cited by examiner

SPEAKER AND VIBRATION CONTROL UNIT

CROSS-REFERENCE TO RELATED APPLICATIONS

This application is based on and claims priority under 35 USC 119 from Japanese Patent Application No. 2014-266041 filed on Dec. 26, 2014, the entire content of which is incorporated herein by reference.

BACKGROUND

1. Technical Field

The present invention relates to a speaker and a vibration control unit.

2. Related Art

A general speaker has a sound output unit, which includes a diaphragm which vibrates, thereby emitting sound, and is connected to a vibrator, and a driving unit which reciprocally vibrates the vibrator such that sound is emitted from the diaphragm. In this speaker, vibration of the diaphragm vibrates acts as a reaction force to vibrate the driving unit, whereby undesirable sound is produced.

For this reason, some speakers further include vibration control units having the same structures as those of their sound output units. In each of those speakers, the backs of both units are connected such that a vibrator of the sound output unit and a vibrator of the vibration control unit vibrate in opposite directions on a common vibration axis, thereby suppressing a driving unit from vibrating (For example, see JP-A-2002-152884.

SUMMARY OF INVENTION

However, in those speakers according to the related art, since the back of a sound output unit is connected to the back of a vibration control unit, sometimes, undesirable sound is produced from the vibration control unit side. In this case, sound produced from the sound output unit and sound produced from the vibration control unit may interfere with each other, resulting in a decrease in the acoustic performance of a corresponding speaker. This phenomenon is remarkable, especially in broadband speakers such as full-range speakers.

In view of above, an illustrative aspect of embodiments is to provide a speaker and a vibration control unit capable of suppressing undesirable sound from being produced.

An aspect of the embodiments provides a speaker includes: a first vibrator that is connected to a diaphragm which vibrates to emit sound; a first driving unit that reciprocally vibrates the first vibrator to vibrate the diaphragm; a second vibrator that is connected to a weight member; a second driving unit that is connected to a side opposite to a side of the first driving unit to which the first vibrator is provided, and reciprocally vibrates the second vibrator on a same vibration axis as a vibration axis of the first vibrator to vibrate the weight member; and a supporting unit that supports a coupled body, configured by joining the second vibrator and the weight member, at two or more portions in the direction of the vibration axis.

According to the aspect of the embodiments, it is possible to provide a speaker and a vibration control unit capable of suppressing undesirable sound from being produced, thereby preventing acoustic performance from deteriorating.

DESCRIPTION OF EMBODIMENTS

Figure 1:
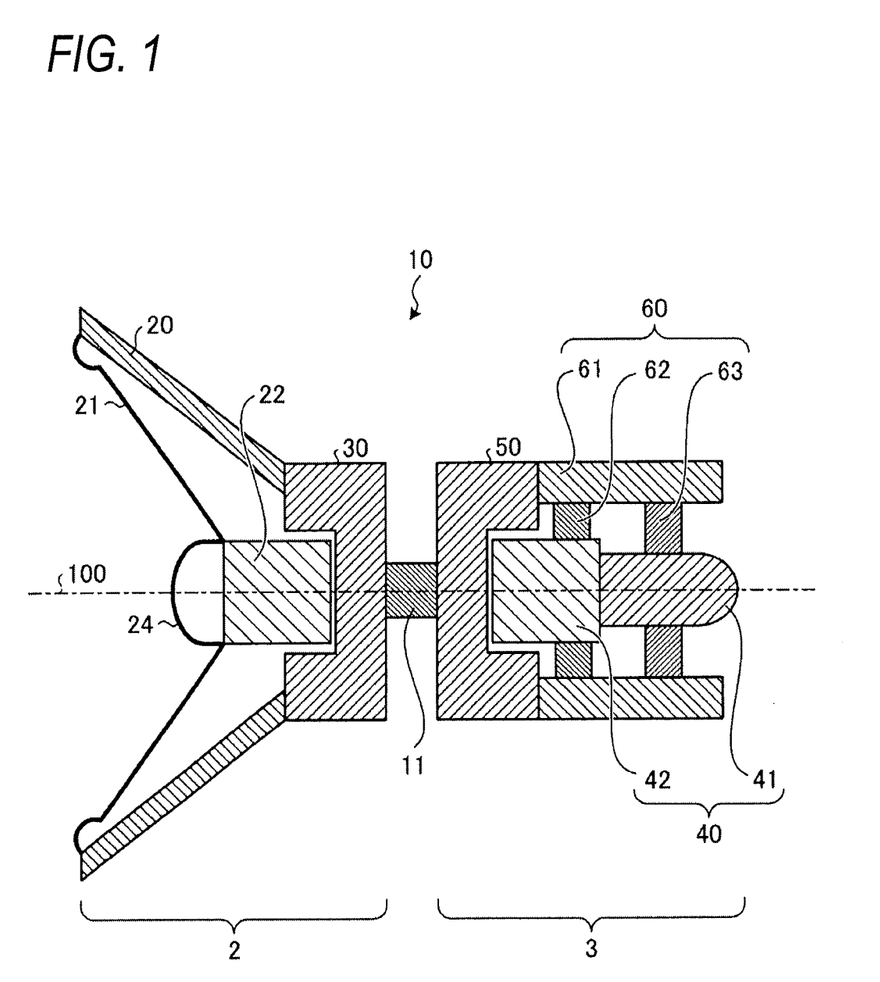
FIG. 1 is an explanatory view as seen in a cross-sectional view schematically illustrating components of a speaker unit which is included in a speaker according to an embodiment.

Hereinafter, embodiments of a speaker and a vibration control unit to be disclosed in this specification will be described in detail. However, the present invention is not limited by the embodiments to be described below. First, the configuration of a speaker unit 10 which is included in a speaker according to an embodiment will be described in brief with reference to FIG. 1. FIG. 1 is an explanatory view as seen in a cross-sectional view schematically illustrating components of the speaker unit 10 which is included in the speaker according to the embodiment. Also, the detailed configuration of the speaker according to the embodiment will be described below with reference to FIGS. 2 to 4.

As shown in FIG. 1, the speaker unit 10 according to the embodiment includes a sound output unit 2 and a vibration control unit 3. The sound output unit 2 includes a diaphragm 21, a first vibrator 22, and a first driving unit 30. The outer circumferential portion of the diaphragm 21 is fixed to a frame 20 with an edge interposed therebetween, and the inner circumferential portion thereof is covered by a cap 24. The leading end portion of the first vibrator 22 is connected to the inner circumferential portion of the diaphragm 21. The first driving unit 30 reciprocally vibrates the first vibrator 22, thereby vibrating the diaphragm 21.

In response to a sound signal which is input from the first driving unit 30, the sound output unit 2 reciprocally vibrates the first vibrator 22 in the direction of a vibration axis 100, thereby vibrating the diaphragm 21 such that sound is emitted from the diaphragm 21.

The vibration control unit 3 is connected to the sound output unit 2 through a connection member 11, and includes a weight member 41, a second vibrator 42, a second driving unit 50, and a supporting unit 60. The sum of the weights of the weight member 41 and the second vibrator 42 corresponds to the sum of the weight of the diaphragm 21, the weight of the cap 24, the weight of the first vibrator 22, and a weight which is obtained by converting a reaction force which the diaphragm 21 receives from the air in a case where the diaphragm 21 vibrates, and the base end portion of the weight member 41 is connected to the leading end portion of the second vibrator 42.

The second vibrator 42 has the same weight as that of the first vibrator 22, and has the same structure as that of the first vibrator 22. As described above, the leading end portion of the second vibrator is connected to the weight member 41. However, the second vibrator 42 and the first vibrator 22 do not necessarily have to have the same weight. The second driving unit 50 has the same weight as that of the first driving unit 30, and has the same configuration as that of the first driving unit 30. However, the second driving unit 50 and the first driving unit 30 do not necessarily have to have the same weight.

The second driving unit 50 is connected to the opposite side of the first driving unit 30 to the first vibrator 22, and reciprocally vibrates the second vibrator 42 on the same vibration axis 100 as the vibration axis 100 of the first vibrator 22, thereby vibrating the weight member 41.

The supporting unit 60 supports a coupled body 40 configured by joining the second vibrator 42 and the weight member 41, at two or more portions in the direction of the vibration axis 100, such that the coupled body 40 can reciprocally vibrate in the direction of the vibration axis 100. For example, the supporting unit 60 includes a frame 61 which is fixed to the second driving unit 50, a first supporting portion 62 which supports a portion of the coupled body 40 positioned on the base end side of the coupled body from the center of the coupled body in the direction of the vibration axis 100, and a second supporting portion 63 which supports a portion of the coupled body 40 positioned on the leading end side of the coupled body from the center of the coupled body in the direction of the vibration axis 100.

Alternatively, the supporting unit 60 may be configured so as to support the coupled body 40 at three or more portions in the direction of the vibration axis 100. Also, as long as the coupled body 40 is supported at two or more portions in the direction of the vibration axis 100 by the first supporting portion 62 and the second supporting portion 63, the two or more portions may be different from the supported portions shown in FIG. 1.

In a case where a voice signal is input to the first driving unit 30, the same voice signal as the voice signal which is input to the first driving unit 30 is input to the second driving unit 50 of the vibration control unit 3. Then, in response to the input voice signal, the second driving unit 50 vibrates the second vibrator 42, thereby reciprocally vibrating the coupled body 40 on the vibration axis 100 in the opposite direction to the vibration direction of the first vibrator 22.

In the present embodiment, as described above, the first driving unit 30 and the second driving unit 50 have the same weight and the same structure. Also, the first vibrator 22 and the second vibrator 42 have the same weight and the same structure. Therefore, the weight member 41 has a weight corresponding to the sum of the weight of the diaphragm 21, the weight of the cap 24, and the weight which is obtained by converting a reaction force which the diaphragm 21 receives from the air in a case where the diaphragm 21 vibrates.

Therefore, according to the speaker of the embodiment, in a case where the sound output unit 2 outputs sound, the vibrating force of the first driving unit 30 which vibrates due to a reaction force from the first vibrator 22 and the vibrating force of the second driving unit 50 which vibrates due to a reaction force from the second vibrator 42 can be offset by each other. Therefore, according to the speaker of the embodiment, it is possible to suppress undesirable sound from being produced due to undesirable vibration of the first driving unit 30 and the second driving unit 50.

Also, in the speaker according to the embodiment, the supporting unit 60 supports the coupled body 40 at two or more portions in the direction of the vibration axis 100 such that the coupled body can reciprocally vibrate in the direction of the vibration axis 100. Therefore, the speaker according to the embodiment can suppress undesirable sound from be produced from the vibration control unit 3, for example, as compared to other speakers in each of which the coupled body 40 is supported at one portion in the direction of the vibration axis 100.

Specifically, in those speakers in each of which the coupled body 40 is supported at one portion in the direction of the vibration axis 100, the coupled body 40 may swing on the supported portion, thereby vibrating in a direction different from the direction of the vibration axis 100, resulting in production of undesirable sound.

In contrast, in the speaker according to the embodiment, the coupled body 40 is supported at two or more portions in the direction of the vibration axis 100, such that the coupled body can reciprocally vibrate in the direction of the vibration axis 100. Therefore, the speaker according to the embodiment can suppress the coupled body 40 from vibrating in a direction different from the direction of the vibration axis 100, and thus can suppress undesirable sound from being produced from the vibration control unit (3) side.

Now, the configuration of the speaker according to the embodiment will be described in detail with reference to FIGS. 2 to 4. Hereinafter, for ease of explanation, it is assumed that a portion of the speaker where the diaphragm 21 is installed is the front side of the speaker.

Figure 2:
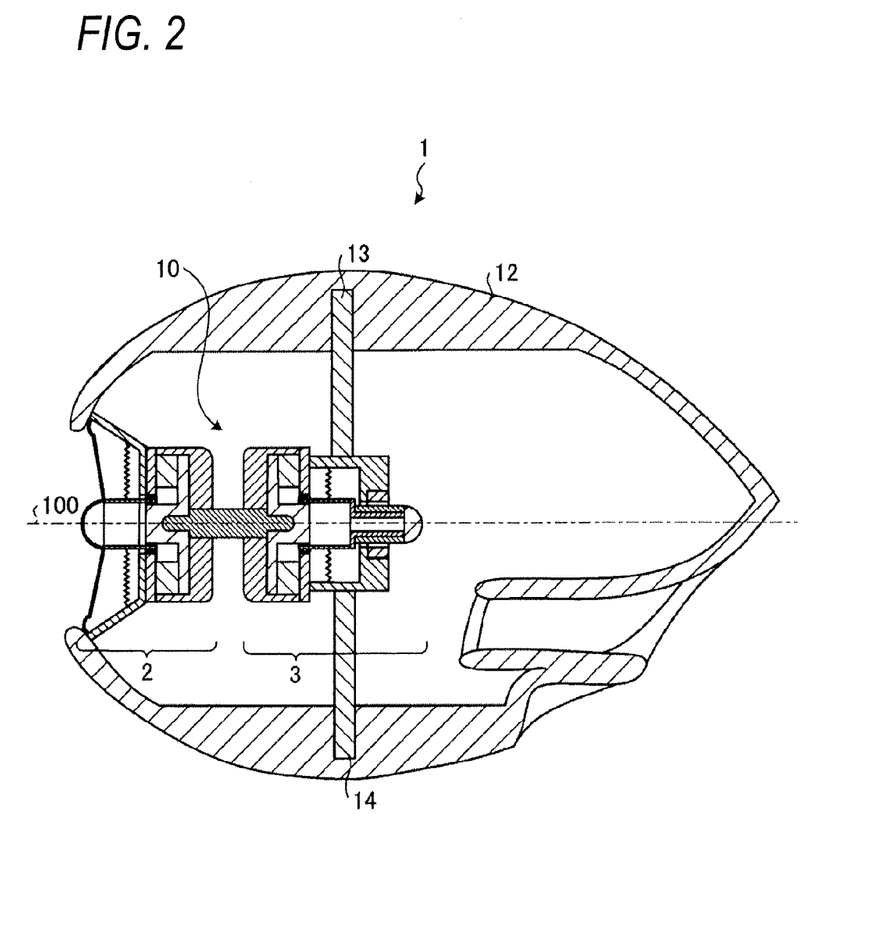
FIG. 2 is an explanatory view illustrating a cross section of the speaker according to the embodiment.
Figure 3:
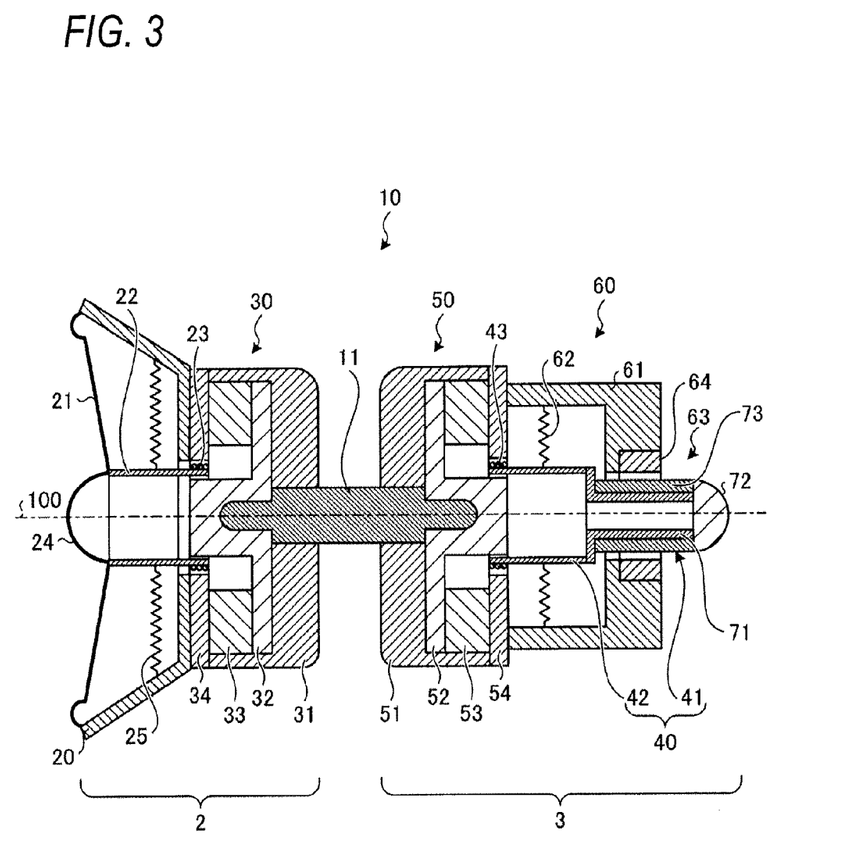
FIG. 3 is an explanatory view as seen in an enlarged cross-sectional view illustrating a portion including the speaker unit according to the embodiment.

FIG. 2 is an explanatory view illustrating a cross section of the speaker according to the embodiment, and FIG. 3 is an explanatory view as seen in an enlarged cross-sectional view illustrating a portion including the speaker unit 10 according to the embodiment. In FIGS. 2 and 3, components corresponding to the components shown in FIG. 1 are denoted by the same reference symbols as those shown in FIG. 1. Also, FIG. 4 is an explanatory view illustrating a cross section perpendicular to the vibration axis 100 of the second supporting portion 63 according to the embodiment.

As shown in FIG. 2, the speaker 1 according to the embodiment includes an enclosure 12 and the speaker unit 10. The enclosure 12 is a housing having an internal space capable of storing the speaker unit 10 and having a front opening for emitting sound produced from the diaphragm 21 (see FIG. 1) of the speaker unit 10.

As described above, the speaker unit 10 includes the sound output unit 2 and the vibration control unit 3. The detailed configurations of the sound output unit 2 and the vibration control unit 3 will be described below with reference to FIG. 3. On the lower side of the inner circumferential surface of the upper side of the enclosure 12, one end of a stay 13 is fixed, and on the inner circumferential surface of the lower side of the enclosure 12, one end of a stay 14 is fixed. Then, the speaker unit 10 is stored in the enclosure 12 such that it is supported by the other ends of the stays.

The sound output unit 2 has a dynamic type structure as shown in FIG. 3. Specifically, the sound output unit 2 includes the first driving unit 30, the first vibrator 22, and the diaphragm 21. The first driving unit 30 includes a case 31, a yoke 32, a magnet 33, a plate 34, and a voice coil 23.

The case 31 has a disc-like bottom and a cylindrical side wall, and is disposed such that the disc plane of the bottom is perpendicular to the vibration axis 100 of the first vibrator 22 and the center of the disc plane is positioned on the vibration axis 100. The case 31 is formed of a magnetic material such as a steel plate, and stores the yoke 32 and the magnet 33 therein.

The yoke 32 has a disc-like portion which has substantially the same shape as that of the inner surface of the bottom of the case 31, and a columnar portion which extends from the center of the disc-like portion so as to be vertical to the disc-like portion. The yoke 32 is formed of a metal, and is disposed inside the case 31 such that the columnar portion protrudes toward the front side.

The magnet 33 is a cylindrical permanent magnet which surrounds the side surface of the columnar portion of the yoke 32. The magnet 33 has an external diameter which is almost the same as the diameter of the disc-like portion of the yoke 32, and an internal diameter which is larger than the diameter of the columnar portion of the yoke 32. Therefore, between the side surface of the columnar portion of the yoke 32 and the inner circumferential surface of the magnet 33, a gap is formed.

The plate 34 is a doughnut-like metal plate which is provided on the opened front surface of the case 31 and has an opening for inserting the leading end portion of the columnar portion of the yoke 32. Into a gap between the opening of the plate 34 and the columnar portion of the yoke 32, the base end portion of the cylindrical first vibrator 22 is inserted so as to be slidable in the direction of the vibration axis 100. The voice coil 23 is a coil which is wound around the base end portion of the first vibrator 22.

The first driving unit 30 forms a magnetic flux, such that the magnetic flux emanates from the magnet 33, and passes through the columnar portion of the yoke 32 and the disc-like portion of the yoke 32, and returns to the magnet 33. In the state where the magnetic flux has been formed, if a voice signal is input to the voice coil 23, in the first driving unit 30, the Lorentz force is generated on the voice coil 23, and reciprocally vibrates the first vibrator 22 in the direction of the vibration axis 100.

On the front surface of the first driving unit 30 (the front surface of the plate 34), the frame 20 having a bowl shape is provided. The bottom of the bowl-shaped frame 20 has an opening having the same diameter as that of the opening of the plate 34, and is stuck to the front surface of the plate 34.

The first vibrator 22 is a cylindrical member which is formed of a material such as a resin or paper. As described above, the base end portion of the first vibrator 22 having the voice coil 23 wound thereon is inserted into the gap between the opening of the plate 34 and the columnar portion of the yoke 32. Also, the leading end portion of the first vibrator 22 is covered by the cap 24, and the central portion of the first vibrator 22 in the direction of the vibration axis 100 is supported by a butterfly damper 25. The butterfly damper 25 may be a damper for absorbing vibration of the first vibrator 22.

The cap 24 is a dome-shaped member which protrudes toward the front side. The outer circumference of the butterfly damper 25 is fixed to the inner circumferential surface of the frame 20, and the inner circumference thereof supports the first vibrator 22 such that the first vibrator can vibrate in the direction of the vibration axis 100.

The diaphragm 21 is a doughnut-shaped member which is formed of a material such as paper, and the outer circumference thereof is fixed to the frame 20 with the edge interposed therebetween, and the inner circumference thereof is connected to the side surface of the leading end portion of the first vibrator 22. Then, in a case where a voice signal is input to the voice coil 23, the diaphragm 21 vibrates in cooperation with the first vibrator 22 reciprocally vibrating in the direction of the vibration axis 100, thereby emitting sound according to the voice signal.

The vibration control unit 3 includes the second driving unit 50, the second vibrator 42, the weight member 41, and the supporting unit 60. The second driving unit 50 has the same structure as that of the first driving unit 30, and includes a case 51, a yoke 52, a magnet 53, a plate 54, and a voice coil 43. The second driving unit 50 is connected to the first driving unit 30 by the connection member 11 such that the back of the second driving unit faces the back of the first driving unit. Also, the second vibrator 42 is identical to the first vibrator 22, and is provided such that the centers of the opened front and rear surface thereof having openings are positioned on the vibration axis 100.

Similarly to the first driving unit 30, in a case where a voice signal is input to the voice coil 43, the second driving unit 50 reciprocally vibrates the second vibrator 42 in the direction of the vibration axis 100. Since the first driving unit 30 and the second driving unit 50 are disposed such that their backs face each other, the second vibrator 42 reciprocally vibrates in the opposite direction to the vibration direction of the first vibrator 22. In other words, voice signal lines are connected to signal input terminals of the vibration control unit 3, so as to have a polarity such that the second vibrator 42 can reciprocally vibrate in the opposite direction to the vibration direction of the first vibrator 22.

The weight member 41 includes a cylindrical housing 71 which is formed of a material such as a resin so as to have a flange on the base end side, a hemispherical weight 72 which protrudes toward the rear side so as to cover an opening of the leading end side of the housing 71, and a first magnet 73 which is provided on the circumferential surface of the side of the housing 71. The flange of the base end of the weight member 41 is connected to the leading end of the second vibrator 42, such that the weight member can reciprocally vibrate in the direction of the vibration axis 100 according to reciprocating vibration of the second vibrator 42.

In this case, since the weight 72 which is provided at the leading end of the weight member 41 has a hemispherical shape protruding toward the rear side, it is possible to suppress undesirable sound from being produced by friction of the weight 72 and the air. However, the shape of the weight 72 is not limited to the hemispherical shape, and may have any other streamline shape capable of reducing the resistance of the air.

The weight member 41 has a weight corresponding to the sum of the weight of the diaphragm 21, the weight of the cap 24, and the weight which is obtained by converting a reaction force which the diaphragm 21 receives from the air in a case where the diaphragm 21 vibrates.

The supporting unit 60 includes the frame 61, the first supporting portion 62, and the second supporting portion 63. The frame 61 has a doughnut-like bottom having a predetermined thickness and having an opening through which the weight member 41 can pass, and a cylindrical side wall which extends from the outer circumferential portion of the bottom so as to be vertical to the bottom. In a state where the bottom of the frame 61 is directed toward the rear side, the weight member 41 is inserted through the opening of the frame. Then, the opened end of the side wall of the frame is fixed to the back of the plate 54 of the second driving unit 50.

The first supporting portion 62 is a butterfly damper, and the outer circumference thereof is fixed to the inner surface of the side wall of the frame 61, and the inner circumference thereof supports the second vibrator 42 such that the second vibrator can vibrate in the direction of the vibration axis 100. Also, the first supporting portion 62 supports a portion of the coupled body 40 of the second vibrator 42 and the weight member 41 positioned on the front side from the center position of the coupled body in the direction of the vibration axis 100.

The second supporting portion 63 is a contactless supporting portion which includes a second magnet 64 which is disposed on the inner circumferential surface of the opening of the bottom of the frame 61 so as to face the first magnet 73 and supports the coupled body 40 in a floating state by a repulsive force magnetically induced between the first magnet 73 and the second magnet 64.

Now, with reference to FIGS. 4 and 5, the shapes of the first magnet 73 and the second magnet 64 will be described in detail. FIG. 4 is an explanatory view illustrating a cross section perpendicular to the vibration axis 100 of the first magnet 73 and the second magnet 64 according to the embodiment, and FIG. 5 is an explanatory view illustrating a cross section perpendicular to the vibration axis of a first magnet and a second magnet according to a first modification of the embodiment.

Figure 4:
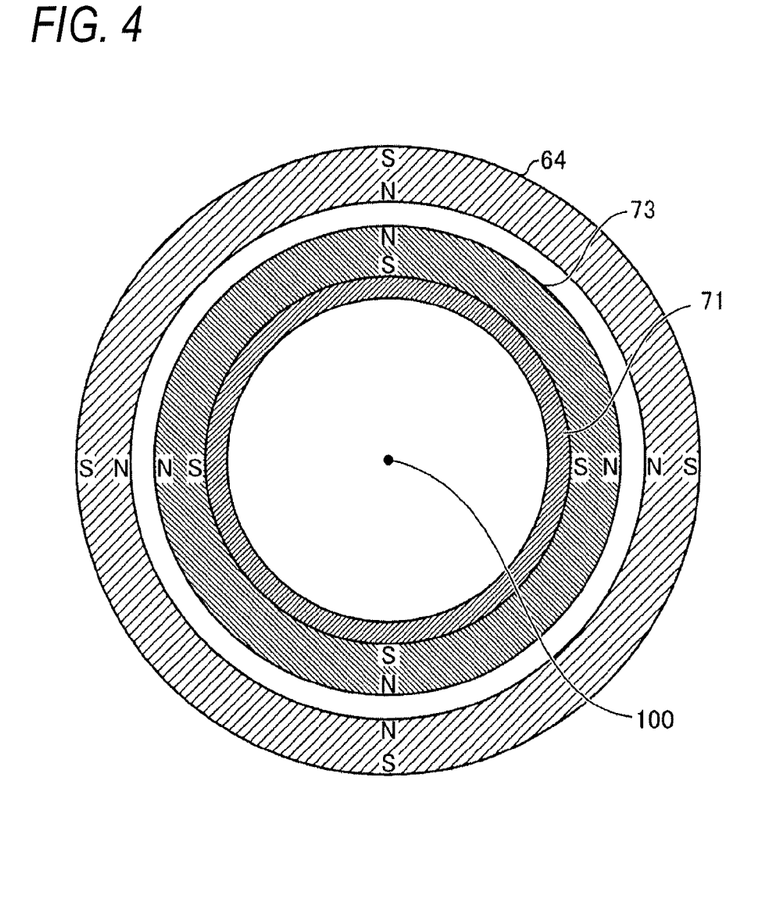
FIG. 4 is an explanatory view illustrating a cross section perpendicular to the vibration axis of a first magnet and a second magnet according to the embodiment.
Figure 5:
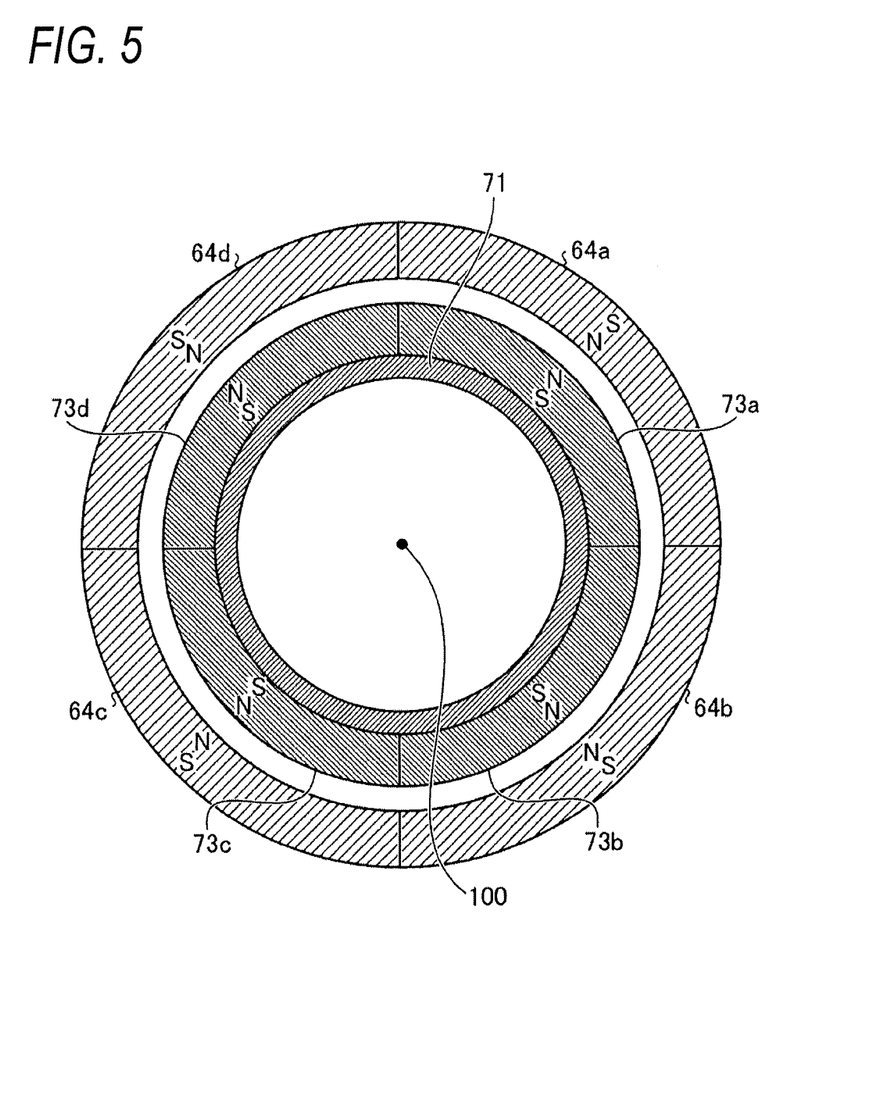
FIG. 5 is an explanatory view illustrating a cross section perpendicular to the vibration axis of a first magnet and a second magnet according to a first modification of the embodiment.

As shown in FIG. 4, the first magnet 73 has a cylindrical shape having an internal diameter which is almost the same as the diameter of the outer circumference of the housing 71, so as to be capable of surrounding the outer circumferential surface of the side of the housing 71 if the housing is fit therein. Also, the second magnet 64 has a cylindrical shape so as to be capable of surrounding the outer circumferential surface of the side of the first magnet 73 with a gap interposed therebetween. However, the first magnet 73 and the second magnet 64 do not need to be perfectly cylindrical, and may be any other cylindrical shapes.

The first magnet 73 is magnetized in the radial direction from the vibration axis 100 such that the inner circumferential side thereof becomes an S pole and the outer circumferential side thereof becomes an N pole. Meanwhile, the second magnet 64 is magnetized in the radial direction from the vibration axis 100 such that the inner circumferential side thereof becomes an N pole and the outer circumferential side thereof becomes an S pole.

Therefore, the second supporting portion 63 can support the coupled body 40 in a floating state by a repulsive force magnetically induced between the first magnet 73 and the second magnet 64. Also, in a case of using, as the first magnet, a magnet magnetized such that the inner circumferential side thereof becomes an N pole and the outer circumferential side thereof becomes an S pole, as the second magnet, a magnet magnetized such that the inner circumferential side thereof becomes an S pole and the outer circumferential side thereof becomes an N pole is used.

As described above, the second supporting portion 63 supports the coupled body 40 in a floating state by a repulsive force magnetically induced between the first magnet 73 and the second magnet 64. Therefore, in a case where the weight member 41 vibrates, it is possible to suppress mechanical vibration sound from being produced.

Also, the vibration control unit 3 may be configured so as to have the first magnet and the second magnet of the first modification shown in FIG. 5, in place of the first magnet 73 and the second magnet 64 shown in FIG. 4. The first magnet of the first modification is formed in a cylindrical shape by joining a plurality of magnets 73a, 73b, 73c, and 73d along the outer circumferential surface of the side of the housing 71 as shown in FIG. 5. Also, the second magnet according to the first modification is formed in a cylindrical shape by joining a plurality of magnets 64a, 64b, 64c, and 64d along the outer circumferential surface of the side of the first magnet with a gap interposed therebetween.

Each of the magnets 73a, 73b, 73c, and 73d constituting the first magnet is magnetized in the radial direction from the vibration axis 100 such that the inner circumferential side thereof becomes an S pole and the outer circumferential side thereof becomes an N pole. Also, each of the magnets 64a, 64b, 64c, and 64d constituting the second magnet is magnetized in the radial direction from the vibration axis 100 such that the inner circumferential side thereof becomes an N pole and the outer circumferential side thereof becomes an S pole.

Meanwhile, in a case of using magnets magnetized such that the inner circumferential sides thereof become N poles and the outer circumferential sides thereof become S poles, as the magnets 73a, 73b, 73c, and 73d constituting the first magnet, magnets magnetized such that the inner circumferential sides thereof become S poles and the outer circumferential sides thereof become N poles are used as the magnets 64a, 64b, 64c, and 64d constituting the second magnet.

Even according to this configuration, it is possible to support the coupled body 40 in a floating state by a repulsive force magnetically induced between the first magnet and the second magnet. Therefore, in a case where the weight member 41 vibrates, it is possible to suppress mechanical vibration sound from being produced. Also, according to the configuration shown in FIG. 5, it is possible to easily attach the first magnet to the housing 71 and easily attach the second magnet to the frame 61.

Also, in the present modification, a case where each of the first magnet and the second magnet is formed in a cylindrical shape by joining four magnets has been described as an example. However, the number of magnets which constitute each of the first magnet and the second magnet is not limited thereto.

Also, in the example shown in FIG. 3, the cylindrical first magnet 73 is provided in the weight member 41. However, the cylindrical first magnet 73 may be positioned such that the inner circumferential surface thereof surrounds the circumferential surface of the side of the second vibrator 42. In this case, the cylindrical second magnet 64 is positioned such that the inner circumferential surface thereof surrounds the circumferential surface of the side of the first magnet 73 with a gap interposed therebetween.

Also, referring to FIG. 3, in the speaker unit 10, since the first driving unit 30 and the second driving unit 50 have the same structure, they have the same weight. Further, since the first vibrator 22 and the second vibrator 42 have the same structure, they have the same weight. Therefore, the weight member 41 has a weight corresponding to the sum of the weight of the diaphragm 21, the weight of the cap 24, and the weight which is obtained by converting a reaction force which the diaphragm 21 receives from the air in a case where the diaphragm 21 vibrates.

Therefore, according to the speaker unit 10, in a case where the sound output unit 2 outputs sound, the vibrating force of the first driving unit 30 vibrating due to a reaction force from the first vibrator 22 and the vibrating force of the second driving unit 50 vibrating due to a reaction force from the second vibrator 42 can be offset by each other. Therefore, according to the speaker unit 10, it is possible to suppress undesirable vibration of the first driving unit 30 and the second driving unit 50.

In the speaker unit 10, the first supporting portion 62 and the second supporting portion 63 support the coupled body 40 at two portions in the direction of the vibration axis 100 such that the coupled body can reciprocally vibrate in the direction of the vibration axis 100. Therefore, the speaker unit 10 can suppress the coupled body 40 from vibrating in a direction different from the direction of the vibration axis 100, and thus can suppress undesirable sound from being produced from the vibration control unit (3) side.

Further, since the second supporting portion 63 supports the coupled body 40 in a floating state by a repulsive force magnetically induced between the first magnet 73 and the second magnet 64, it is possible to suppress mechanical vibration sound from being produced in a case where the weight member 41 vibrates.

Now, a speaker according to a second modification of the embodiment will be described with reference to FIG. 6. The speaker according to the second modification has the same configuration as that shown in FIGS. 2 and 3, except that it has a vibration control unit having a configuration different from that shown in FIGS. 2 and 3.

Therefore, here, a vibration control unit 3a according to the second modification will be described. However, some of the components shown in FIG. 6 identical to those shown in FIG. 3 are denoted by the same reference symbols as those shown in FIG. 3, and will not be described. FIG. 6 is an explanatory view as seen in an enlarged cross-sectional view illustrating a portion including the vibration control unit 3a according to the second modification of the embodiment.

Figure 6:
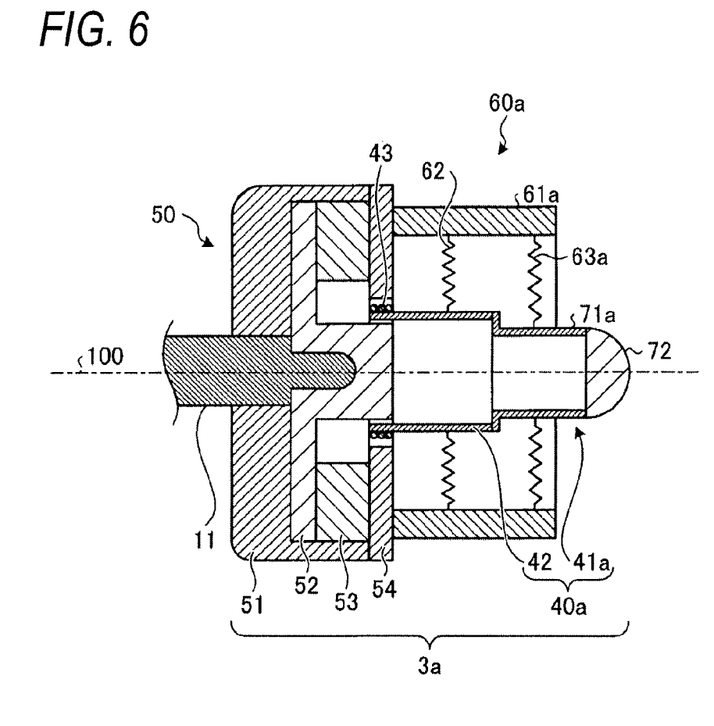
FIG. 6 is an explanatory view as seen in an enlarged cross-sectional view illustrating a portion including a vibration control unit according to a second modification of the embodiment.

As shown in FIG. 6, the vibration control unit 3a according to the second modification includes a second driving unit 50 identical to that shown in FIG. 3, but is different from the vibration control unit 3 shown in FIG. 3 in the shape of a weight member 41a and the configuration of a supporting unit 60a.

Specifically, in the weight member 41a of the vibration control unit 3a shown in FIG. 6, the diameter of a cylindrical portion of a housing 71a is larger than that of the housing 71 shown in FIG. 3, and is the same as the diameter of the attachment surface of the weight 72. Also, the supporting unit 60a of the vibration control unit 3a shown in FIG. 6 is different from that of the vibration control unit 3 shown in FIG. 3, in that a frame 61a is cylindrical and a second supporting portion 63a is a butterfly damper.

The outer circumference of the butterfly damper which is the second supporting portion 63a is fixed to the inner circumference of the frame 61a, such that the inner circumference thereof supports an almost central portion of the housing 71a of the weight member 41a in the direction of the vibration axis 100. Also, the first supporting portion 62 is a butterfly damper, similarly to that of the vibration control unit 3 shown in FIG. 3, and supports an almost central portion of the second vibrator 42 in the direction of the vibration axis 100.

Therefore, the vibration control unit 3a can suppress a coupled body 40a configured by joining the second vibrator 42 and the weight member 41a from vibrating in a direction different from the direction of the vibration axis 100. Also, in the vibration control unit 3a, the shape of the frame 61a of the supporting unit 60a is simply cylindrical, and it is possible to identical butterfly dampers as the first supporting portion 62 and the second supporting portion 63a. Therefore, according to the vibration control unit 3a, it becomes easy to machine the frame 61a, and since the first supporting portion 62 and the second supporting portion 63a have identical components, it is possible to reduce the manufacturing cost.

Figure 7:
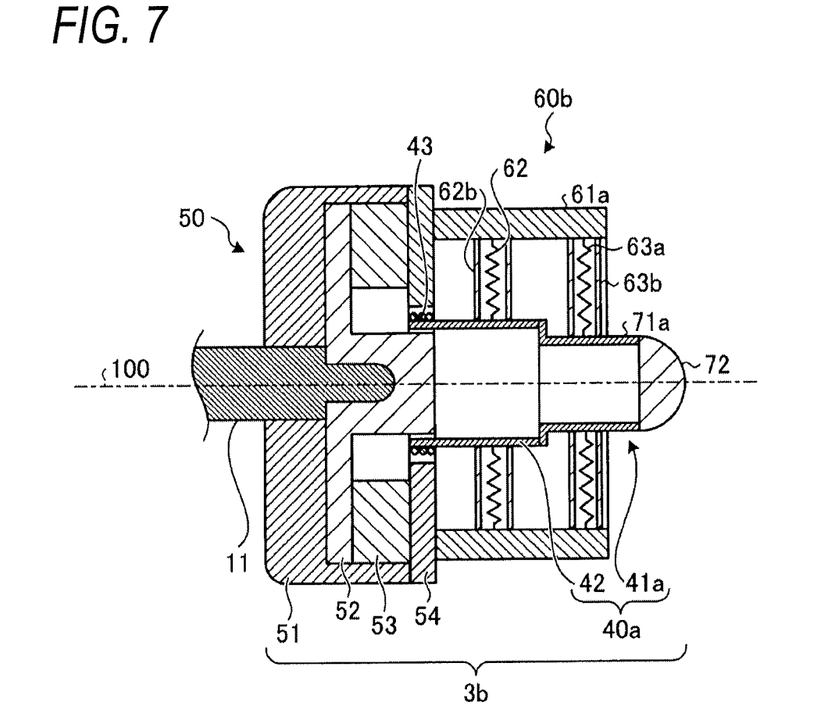
FIG. 7 is an explanatory view as seen in an enlarged cross-sectional view illustrating a portion including a vibration control unit according to a third modification of the embodiment.

Now, with reference to FIG. 7, a speaker according to a third modification will be described. FIG. 7 is an explanatory view as seen in an enlarged cross-sectional view illustrating a portion including a vibration control unit 3b according to the third modification of the embodiment. The speaker according to the third modification has the same configuration as that shown in FIG. 6, except for the vibration control unit 3b. Also, in FIG. 7, components identical to the components shown in FIG. 6 are denoted by the same reference symbols as those shown in FIG. 6.

As shown in FIG. 7, the vibration control unit 3b according to the third modification has the same configuration as that of the vibration control unit 3a shown in FIG. 6, except that a supporting unit 60b includes a cover 62b which covers a butterfly damper which is a first supporting portion 62, and a cover 63b which covers a butterfly damper which is a second supporting portion 63a.

The cover 63b covers the front surface of the butterfly damper which is the second supporting portion 63a. Therefore, in a case where the coupled body 40a configured by joining the second vibrator 42 and the weight member 41a vibrates, the speaker according to the third modification can shut off friction sound between the air and the butterfly dampers which are the first supporting portion 62 and the second supporting portion 63a, by the cover 63b.

Figure 8:
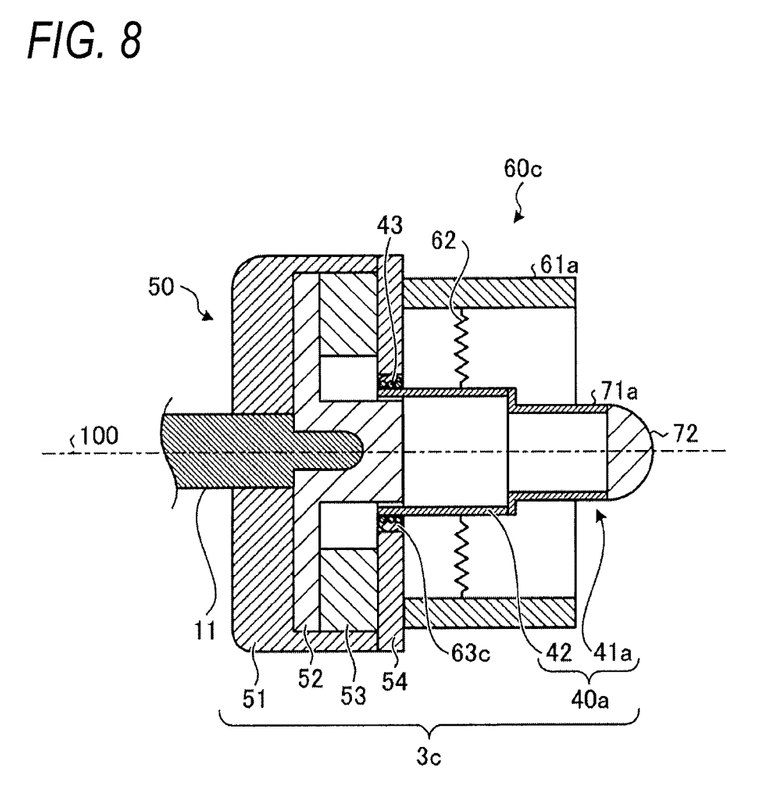
FIG. 8 is an explanatory view as seen in an enlarged cross-sectional view illustrating a portion including a vibration control unit according to a fourth modification of the embodiment.

Now, with reference to FIG. 8, a speaker according to a fourth modification will be described. FIG. 8 is an explanatory view as seen in an enlarged cross-sectional view illustrating a portion including a vibration control unit 3c according to the fourth modification of the embodiment. The speaker according to the fourth modification has the same configuration as that shown in FIG. 6, except for the vibration control unit 3c. Also, in FIG. 8, components identical to the components shown in FIG. 6 are denoted by the same reference symbols as those shown in FIG. 6.

As shown in FIG. 8, a supporting unit 60c of the vibration control unit 3c according to the fourth modification includes a second supporting portion 63c between the voice coil 43 and the plate 54 of the second driving unit 50, in place of the second supporting portion 63a shown in FIG. 6. The second supporting portion 63c is a magnetic fluid which is filled between the voice coil 43 and the plate 54.

As described above, the vibration control unit 3c according to the fourth modification supports the base end portion of the second vibrator 42 by the second supporting portion 63c which is a magnetic fluid. Therefore, the vibration control unit 3c can suppress the second vibrator 42 from operating in a direction different from the direction of the vibration axis 100.

Figure 9:
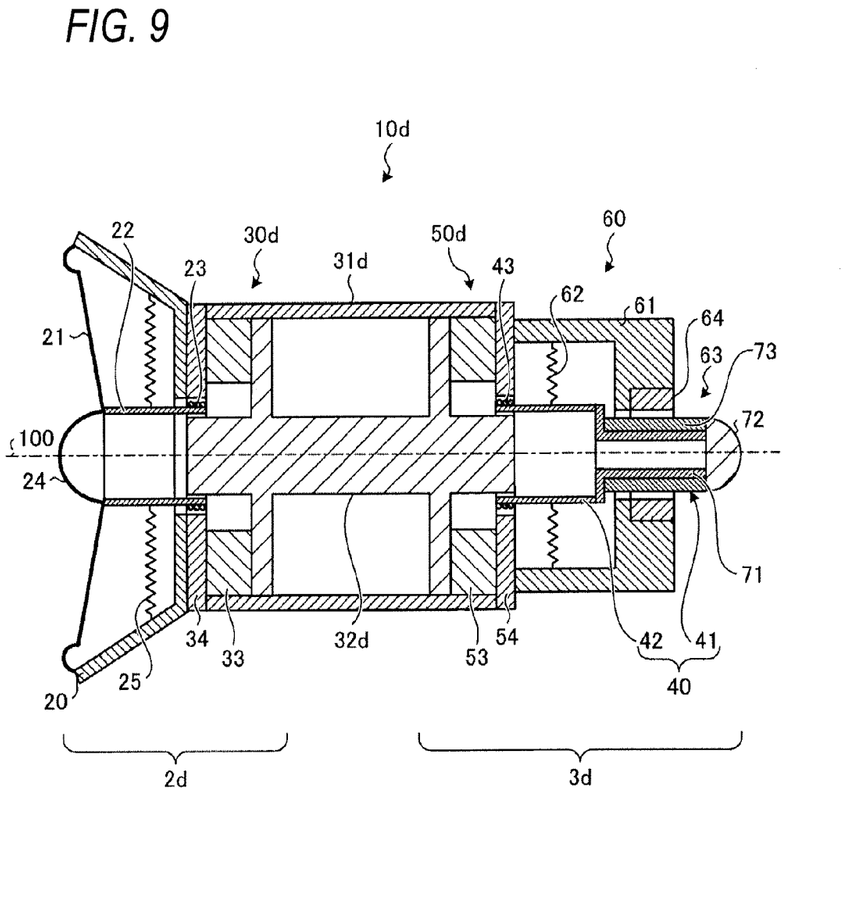
FIG. 9 is an explanatory view as seen in an enlarged cross-sectional view illustrating a portion including a speaker unit according to a fifth modification of the embodiment.

Now, with reference to FIG. 9, a speaker according to a fifth modification will be described. The speaker according to the fifth modification is different from that shown in FIG. 2 in the connection mode of a sound output unit and a vibration control unit. FIG. 9 is an explanatory view as seen in an enlarged cross-sectional view illustrating a portion including a speaker unit 10d according to the fifth modification of the embodiment. Also, some of components shown in FIG. 9 are identical to the components shown in FIG. 3, and thus are denoted by the same reference symbols as those shown in FIG. 3.

As shown in FIG. 9, the speaker unit 10d according to the fifth modification has the same configuration as that of the speaker unit 10 shown in FIG. 3, in that it includes an integrated yoke 32d configured by integrating a yoke of a sound output unit 2d and a yoke of a vibration control unit 3d, and a case 31d is cylindrical.

A portion of the integrated yoke 32d corresponding to the sound output unit 2d has the same shape as that of the yoke 32 shown in FIG. 3. Also, a portion of the integrated yoke 32d corresponding to the vibration control unit 3d has the same shape as that of the yoke 52 shown in FIG. 3. The case 31d stores the integrated yoke 32d and the magnets 33 and 53 therein. Therefore, a first driving unit 30d and a second driving unit 50d are integrated.

Since the sound output unit 2d and the vibration control unit 3d are connected without any join, the speaker unit 10d can prevent undesirable sound from being produced from the connection portion of the sound output unit 2d and the vibration control unit 3d.

Figure 10:
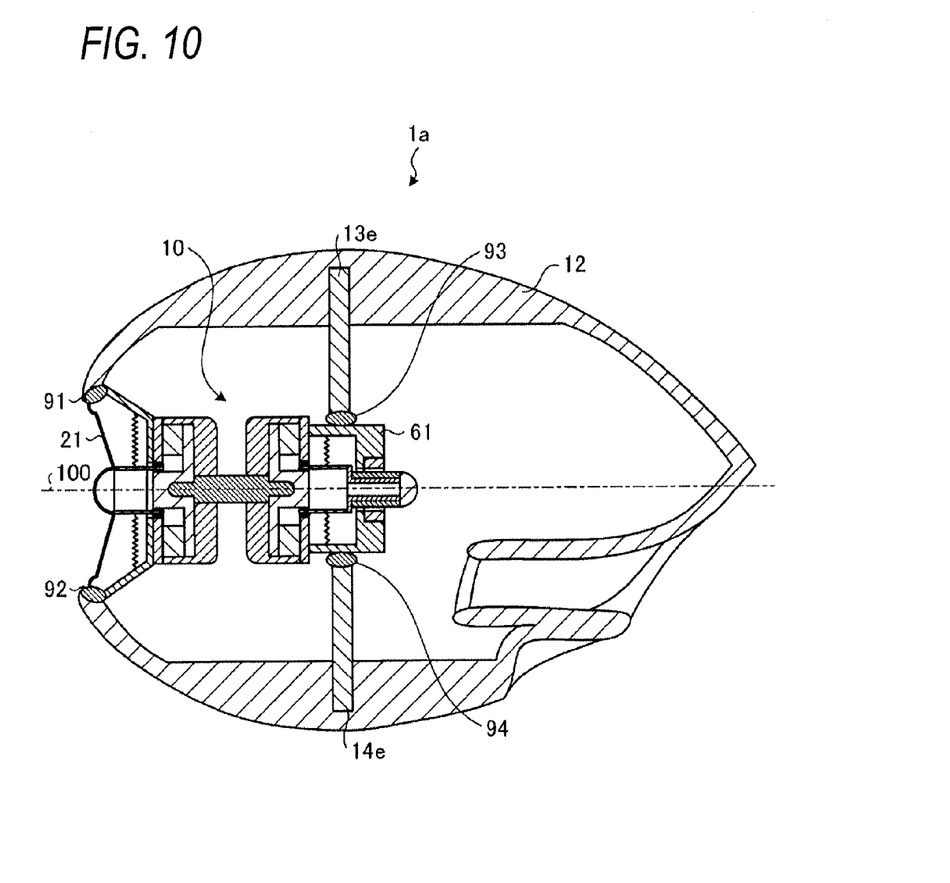
FIG. 10 is an explanatory view illustrating a cross section of a speaker according to a sixth modification of the embodiment.

Now, with reference to FIG. 10, a speaker according to a sixth modification will be described. The mode in which a speaker unit is supported in the enclosure 12 is different from that shown in FIG. 2. FIG. 10 is an explanatory view illustrating a cross section of a speaker 1a according to the sixth modification of the embodiment. Also, some of components shown in FIG. 10 are identical to the components shown in FIG. 2 or 3, and thus are denoted by the same reference symbols as those shown in FIG. 2 or 3.

As shown in FIG. 10, in the speaker 1a according to the sixth modification, one end of a stay 13e is fixed to the inner circumferential surface of the upper side of the enclosure 12, and an elastic buffering member 93 is provided between the frame 61 and the other end of the stay 13e. Further, in the speaker 1a, one end of a stay 14e is fixed to the inner circumferential surface of the lower side of the enclosure 12, and an elastic buffering member 94 is provided between the frame 61 and the other end of the stay 14e. Furthermore, the speaker 1a has elastic buffering members 91 and 92 between the diaphragm 21 and the inner circumference of the front opening of the enclosure 12.

Therefore, the speaker unit 10 is supported in a floating state inside the enclosure 12. According to the speaker 1a can prevent undesirable sound from being produced due to contact of the speaker unit 10 with the enclosure 12 or the stay 13e or 14e.

In the embodiment described above, the coupled body configured by joining the second vibrator and the weight member is supported by two supporting portions, that is, the first supporting portion and the second supporting portion. However, the speaker according to the embodiment may be configured such that the coupled body is supported at three or more portions in the direction of the vibration axis.

In this case, the speaker may be configured such that any one of the first supporting portion 62 which is shown in FIG. 3 and is a butterfly damper, the second supporting portion 63 which is supported by a repulsive force between the first magnet 73 and the second supporting portion 63, and the second supporting portion 63c which is shown in FIG. 8 and is a magnetic fluid supports one of the assemblies 40 and 40a at three or more portions in the direction of the vibration axis 100.

Also, the speaker may be configured by combining two or more supporting portions of the first supporting portion 62 which is shown in FIG. 3 and is a butterfly damper, the second supporting portion 63 which is supported by a repulsive force between the first magnet 73 and the second supporting portion 63, and the second supporting portion 63c which is shown in FIG. 8 and is a magnetic fluid, so as to support one of the assemblies 40 and 40a at three or more portions in the direction of the vibration axis 100.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speaker comprising:
a first vibrator that is connected to a diaphragm which vibrates to emit sound;
a first driving unit that reciprocally vibrates the first vibrator to vibrate the diaphragm;
a second vibrator that is connected to a weight member;
a second driving unit that is connected to a side of the first driving unit opposite to a side on which the first vibrator is provided, and reciprocally vibrates the second vibrator on a same vibration axis as a vibration axis of the first vibrator to vibrate the weight member; and
a supporting unit that supports a coupled body, configured by joining the second vibrator and the weight member, at two or more portions in the direction of the vibration axis, wherein:
the coupled body includes a first magnet provided on a circumferential side of the coupled body;
the supporting unit includes:
a second magnet that is disposed so as to face the first magnet; and
a contactless supporting portion that supports the coupled body in a floating state by a repulsive force between the first magnet and the second magnet;
the weight member includes a cylindrical housing having a base end portion which is connected to the second vibrator;
the first magnet has a cylindrical shape to surround an outer circumferential side surface of the cylindrical housing; and
the second magnet has a cylindrical shape to surround an outer circumferential side surface of the first magnet with a gap interposed between the second magnet and the first magnet.

2. The speaker according to claim 1, wherein:
the first magnet is formed in a cylindrical shape by joining a plurality of magnets along the outer circumferential side surface of the cylindrical housing.

3. The speaker according to claim 1, wherein:
the second magnet is formed in a cylindrical shape by joining a plurality of magnets along the outer circumferential side surface of the first magnet with the gap interposed between the second magnet and the first magnet.

4. The speaker according to claim 1, wherein:
the supporting unit includes a damper whose outer circumferential portion is fixed to a frame and whose inner circumferential portion supports the coupled body.

5. The speaker according to claim 4, further comprising:
a cover that covers the damper.

6. The speaker according to claim 1, wherein:
the second driving unit includes:

a voice coil that is wound around the second vibrator; and an annular magnetized plate that surrounds the voice coil, and the supporting unit includes a magnetic fluid which is filled between the voice coil and the plate.

7. The speaker according to claim 1, wherein:

a leading end portion of the weight member has a streamline shape.

8. The speaker according to claim 1, wherein:

the first driving unit and the second driving unit are integrated.

9. The speaker according to claim 1, further comprising:

a housing that stores the first vibrator, the first driving unit, the second vibrator, and the second driving unit, and has an opening where the diaphragm is installed;

a stay that has one end which is fixed to an inner circumferential surface of the housing;

a buffering member that is provided between another end of the stay and the supporting unit; and a buffering member that is provided between a periphery of the diaphragm and an inner circumferential portion of the opening, wherein the first vibrator, the first driving unit, the second vibrator, and the second driving unit are supported in a floating state inside the housing.

10. The speaker according to claim 1, wherein the first and second driving units are spaced apart from, and connected to, each other along the vibration axis.

11. The speaker according to claim 10, wherein the first and second driving units are spaced apart from, and connected to, each other by a connection member.

12. The speaker according to claim 10, wherein the first and second driving units are spaced apart from, and connected to, each other by a yoke.

* * * * *